United States Patent
Ungar et al.

(10) Patent No.: US 6,842,182 B2
(45) Date of Patent: Jan. 11, 2005

(54) PERCEPTUAL-BASED COLOR SELECTION FOR TEXT HIGHLIGHTING

(75) Inventors: David M. Ungar, Mountain View, CA (US); Kristen A. McIntyre, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 87 days.

(21) Appl. No.: 10/318,634

(22) Filed: Dec. 13, 2002

(65) Prior Publication Data

US 2004/0113916 A1 Jun. 17, 2004

(51) Int. Cl.[7] ................................................ G09G 5/02
(52) U.S. Cl. ...................... 345/589; 345/593; 345/597; 358/453; 358/462
(58) Field of Search ................................ 345/589, 593, 345/597; 358/2.1, 453, 448, 462

(56) References Cited

U.S. PATENT DOCUMENTS

| | | | | |
|---|---|---|---|---|
| 5,048,109 A | * | 9/1991 | Bloomberg et al. | 382/164 |
| 5,138,465 A | * | 8/1992 | Ng et al. | 358/453 |
| 5,579,407 A | * | 11/1996 | Murez | 382/164 |
| 5,649,024 A | * | 7/1997 | Goldsmith | 382/170 |
| 6,067,555 A | * | 5/2000 | Hayashi | 715/528 |
| 2002/0165707 A1 | * | 11/2002 | Call | 704/2 |
| 2003/0103082 A1 | * | 6/2003 | Carroll | 345/769 |

OTHER PUBLICATIONS

"Effective Color Contrast: Designing for People with Partial Sight and Color Deficiencies", Arditi, A., Lighthouse International, pp. 1–5, obtained at http://www.lighthouse.org/text_only/t_color_contrast_2.htm on Feb. 13, 2003.

"Making Text Legible: Designing for People with Partial Sight", Arditi, A., Lighthouse International, pp. 1–5, obtained at http://www.lighthouse.org/text_only/t_print_leg.htm on Feb. 13, 2003.

* cited by examiner

Primary Examiner—Matthew Luu
Assistant Examiner—Daniel J Chung
(74) Attorney, Agent, or Firm—Gunnison, McKay & Hodgson, L.L.P.; Lisa A. Norris

(57) ABSTRACT

The present invention varies the highlight color of a highlighted display area such that the salience of the highlighted display area remains constant to a user as the highlighted display area varies. A perceptual highlight color is determined based upon the total amount of highlighted display area and the background color of the non-highlighted display area and applied to text selected to be highlighted by a user as well as to text already highlighted on the display. In other embodiments, the perceptual highlight color can be based upon the total amount of highlighted display area and the text color of the text in the highlighted display area, and the total amount of the highlighted display area, the background color of the non-highlighted display area, and the text color.

24 Claims, 6 Drawing Sheets

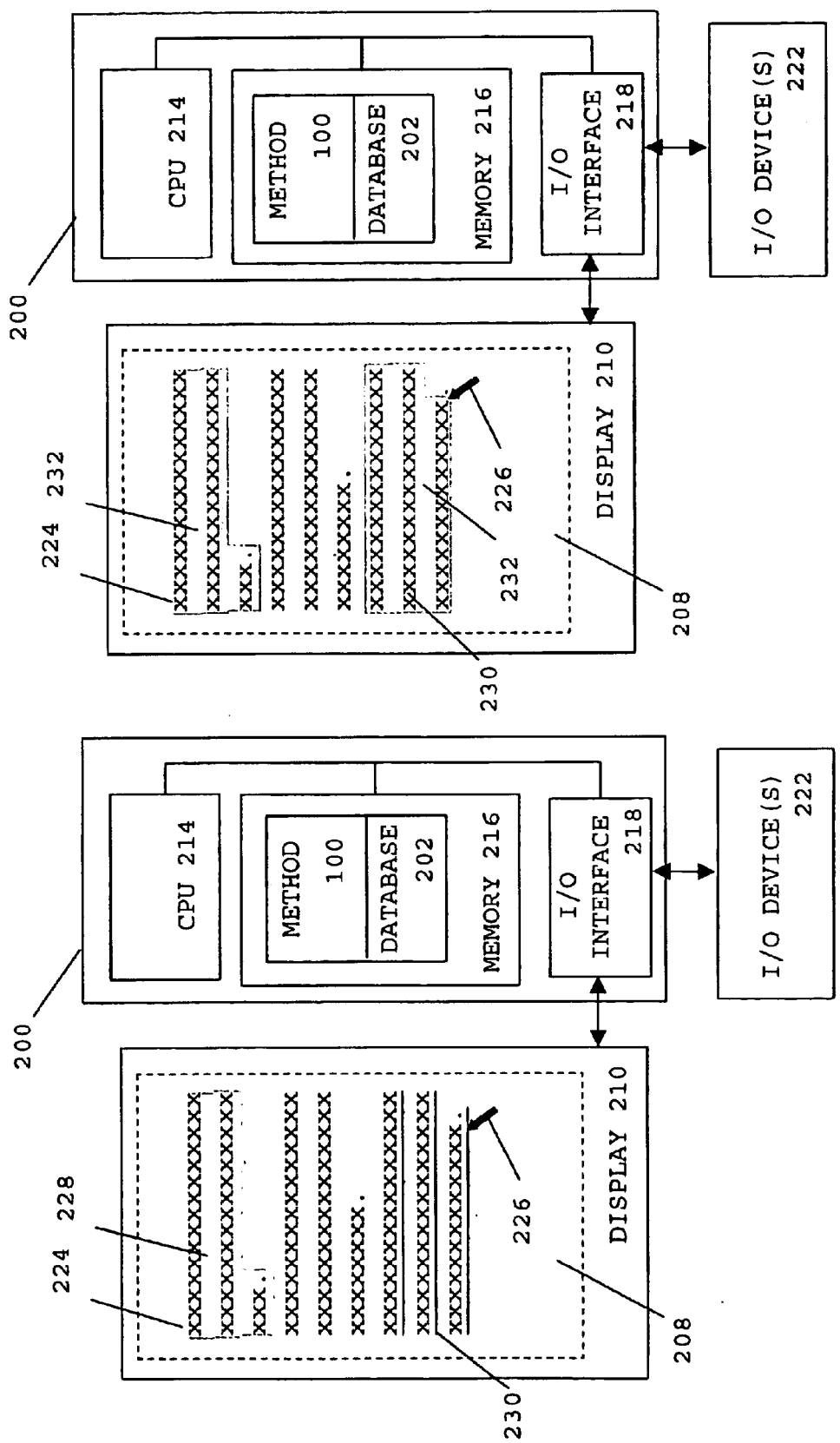

PERCEPTUAL-BASED COLOR SELECTION FOR TEXT HIGHLIGHTING

BACKGROUND OF THE INVENTION

1. Field of the Invention

The present invention relates generally to manipulation of text on a display.

2. Description of Related Art

Graphical user interfaces utilized with current computer systems typically incorporate a method to highlight text on a display. For example, a word processor permits a user to select text on a display by holding down an input device, such as a mouse button, and dragging a cursor over the text to be highlighted. In order to give feedback to the user about what text is selected, the word processor highlights the selected text on the display. Conventionally, the color of either the text, the background behind the text, or both are changed.

The color used for highlighting text can be important to a user, and most computer systems permit the user to select the color of the highlighted text. The highlighted text should stand out enough to allow the user to rapidly find the highlighted text on a busy display. Yet, the highlighted text should not stand out so much that the user's eye is distracted from other display elements that are also important for other tasks. For example, when a large amount of display area is taken up by highlighted text, a vivid highlight color can be too distracting. However, when a single letter is highlighted, a moderate to light highlight color can be too hard to see.

SUMMARY OF THE INVENTION

According to the principles of this invention, the highlight color of a highlighted display area is varied such that the salience of the highlighted display area remains constant to a user as the highlighted display area varies. In one embodiment, a perceptual highlight color is determined based upon the total amount of highlighted display area and the background color of the non-highlighted area. The perceptual highlight color is applied to text selected to be highlighted by a user, as well as, to text already highlighted on the display. In additional embodiments, the perceptual highlight color can be based upon the total amount of highlighted display area and the text color of the text in the highlighted display area, and upon the total amount of highlighted display area, the background color of the non-highlighted display area and the text color.

According to one embodiment, a method for providing perceptual-based color selection for highlighting text on a display includes: selecting text to be highlighted in a highlighted display area of a display; determining the total display area on a display, the display capable of displaying a highlighted display area and a non-highlighted display area, the non-highlighted display area having a background color; determining the total highlighted display area on the display, the highlighted display area including areas of text selected to be highlighted and areas of text highlighted on the display; determining the background color of the non-highlighted display area; determining the perceptual highlight color to be applied to the highlighted display area based upon the total highlighted display area and the background color; and displaying the highlighted display area(s), including the text, on the display highlighted with the perceptual highlight color.

In some embodiments, the highlighted display area includes text having a text color, and the method further includes: determining the text color; and wherein determining the perceptual highlight color of the highlighted display area is further based upon the text color.

In another embodiment, a method for providing perceptual-based color selection for highlighting text on a display includes: selecting text to be highlighted in a highlighted display area of a display, the text having a text color; determining the total display area on a display, the display capable of displaying a highlighted display area and a non-highlighted display area, the non-highlighted display area having a background color; determining the total highlighted display area on the display, the highlighted display area including text selected to be highlighted and text highlighted on the display; determining the text color; determining the perceptual highlight color to be applied to the highlighted display area based upon the total highlighted display area and the text color; and displaying the highlighted display area on the display highlighted with the perceptual highlight color.

In a further embodiment, a computer program product for providing perceptual-based color selection for highlighting text on a display has stored thereon computer-readable instructions for a method including: selecting text to be highlighted as a highlighted display area of a display; determining the total display area on a display, the display capable of displaying a highlighted display area and a non-highlighted display area, the non-highlighted display area having a background color; determining the total highlighted display area on the display, the highlighted display area including text selected to be highlighted and text highlighted on the display; determining the background color of the non-highlighted display area; determining the perceptual highlight color to be applied to the highlighted display area based upon the total highlighted display area and the background color; and displaying the highlighted display area on the display highlighted with the perceptual highlight color.

In some embodiments, the text further has a text color, and the method further includes: determining the text color of the text to be highlighted; and wherein determining the perceptual highlight color of the highlighted display area is further based upon the text color.

In yet another embodiment, a computer program product for providing perceptual-based color selection for highlighting text on a display has computer-readable instructions for a method including: selecting text to be highlighted as a highlighted display area of a display, the text having a text color; determining the total display area on a display, the display capable of displaying a highlighted display area and a non-highlighted display area, the non-highlighted display area having a background color; determining the total highlighted display area on the display, the highlighted display area including text selected to be highlighted and text highlighted on the display; determining the text color; determining the perceptual highlight color to be applied to the highlighted display area based upon the total highlighted display area and the text color; and displaying the highlighted display area on the display highlighted with the perceptual highlight color.

In yet a further embodiment, a method for providing perceptual-based color selection for highlighting text on a display includes: means for selecting text to be highlighted in a highlighted display area of a display; means for determining the total display area on a display, the display capable of displaying a highlighted display area and a non-highlighted display area, the non-highlighted display area having a background color; means for determining the total highlighted display area on the display, the highlighted display area including areas of text selected to be highlighted and areas of text highlighted on the display; means for determining the background color of the non-highlighted display area; means for determining the perceptual highlight color to be applied to the highlighted display area based upon the total highlighted display area and the background color; and means for displaying the highlighted display area(s), including the text, on the display highlighted with the perceptual highlight color.

In some embodiments, the highlighted display area includes text having a text color, and the method further includes: means for determining the text color, and wherein the means for determining the perceptual highlight color of the highlighted display area is further based upon the text color.

In another embodiment, a method for providing perceptual-based color selection for highlighting text on a display includes: means for selecting text to be highlighted in a highlighted display area of a display, the text having a text color; means for determining the total display area on a display, the display capable of displaying a highlighted display area and a non-highlighted display area, the non-highlighted display area having a background color; means for determining the total highlighted display area on the display, the highlighted display area including text selected to be highlighted and text highlighted on the display; means for determining the text color; means for determining the perceptual highlight color to be applied to the highlighted display area based upon the total highlighted display area and the text color; and means for displaying the highlighted display area on the display highlighted with the perceptual highlight color.

As a result of these and other features discussed in more detail below, methods and software designed according to the principles of the present invention provide a user heightened salience of highlighted text areas when compared to the prior art techniques earlier described by highlighting text with a perceptual highlight color.

It is to be understood that both the foregoing general description and the following detailed description are intended only to exemplify and explain the invention as claimed.

BRIEF DESCRIPTION OF THE DRAWINGS

The accompanying drawings, which are incorporated in, and constitute a part of this specification illustrate embodiments of the present invention, and together with the description, serve to explain the principles of the invention.

In the drawings:

FIGS. 2A through 2D illustrate exemplar display sequences in which the perceptual highlight color of method 100 is varied as the amount of highlighted display area changes according to one embodiment of the present invention;

DETAILED DESCRIPTION

The present invention provides methods and software that vary the highlight color of a highlighted display area such that the salience of the highlighted display area remains constant to a user as the total highlighted display area varies. In the context of the present invention, the term salience means how noticeable a viewing user perceives the highlighted display area to be.

In particular, the highlight color determined according the present invention is termed the perceptual highlight color. In one embodiment, the perceptual highlight color is determined based upon the total highlighted display area and the background color of the non-highlighted display area. In other embodiments, the perceptual highlight color is based upon, the total highlighted display area and the text color of the text in the highlighted display area, and the total highlighted display area, the background color of the non-highlighted display area and the text color. The perceptual based highlight color determined according to the present invention provides a user heightened salience of highlighted text over the prior art techniques earlier described.

FIG. 1 and FIGS. 2A through 2D are now referred to in describing one embodiment of the invention in which a perceptual highlight color is utilized to highlight text on a display. The perceptual highlight color varies as the total amount of highlighted display area changes on the display. Particularly, as the total amount of highlighted display area increases, the contrast of the perceptual highlight color with the background color of the non-highlighted display area is decreased. Conversely, as the total amount of highlighted display area decreases, the contrast of the perceptual highlight color with the background color of the non-highlighted display area is increased.

Figure 1:
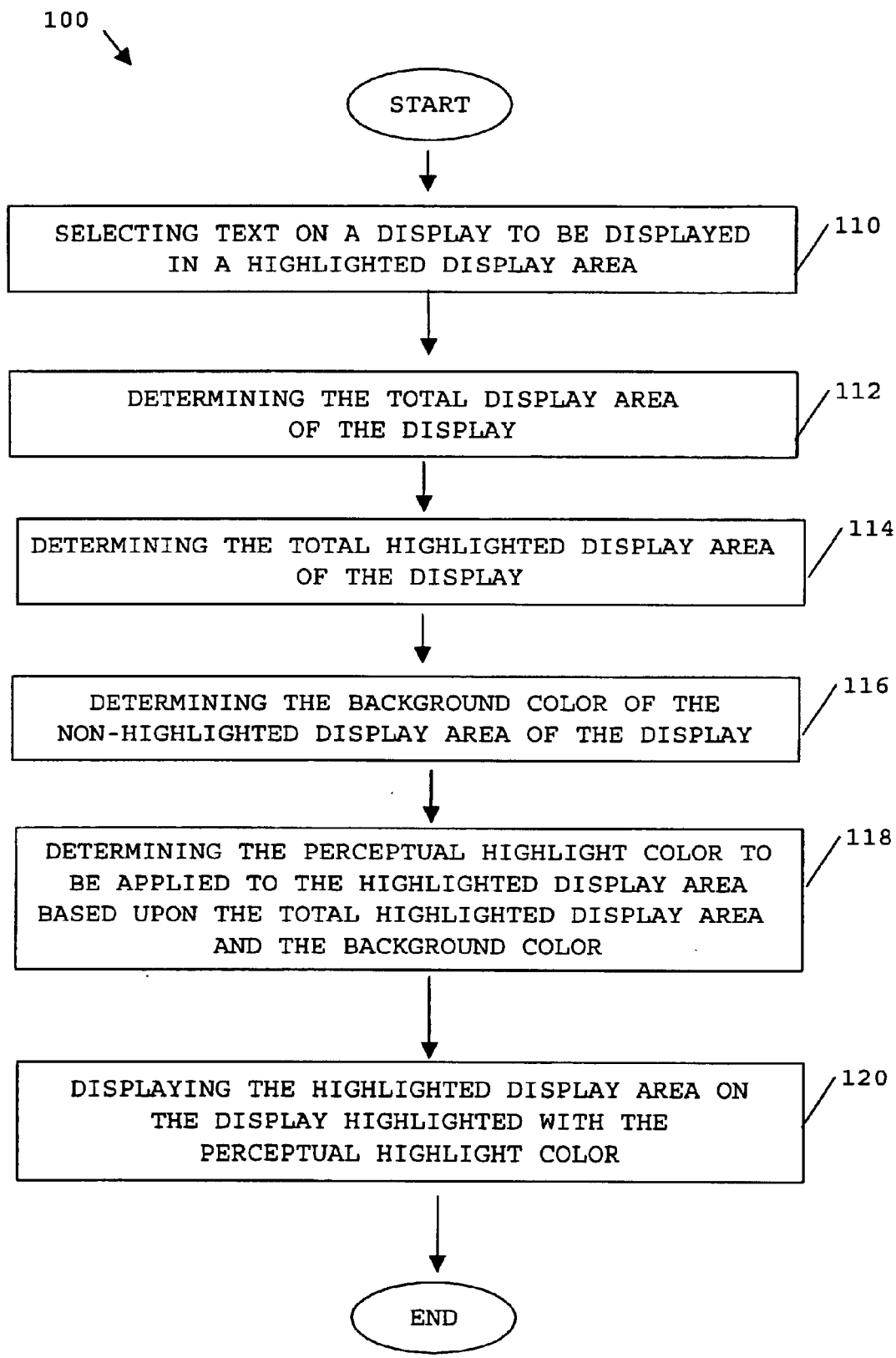
FIG. 1 illustrates a process flow diagram of a method 100 for providing perceptual-based color selection for highlighting text on a display based upon the total highlighted display area and the background color of the non-highlighted display area according to one embodiment of the present invention.

FIG. 1 illustrates a process flow diagram of a method 100 for providing perceptual-based color selection for highlighting text on a display based upon the total highlighted display area and the background color of the non-highlighted display area according to one embodiment of the present invention. FIGS. 2A through 2D illustrate exemplar display sequences in which the perceptual highlight color of method 100 is varied as the total amount of highlighted display area changes according to one embodiment of the present invention.

Figure 2B:
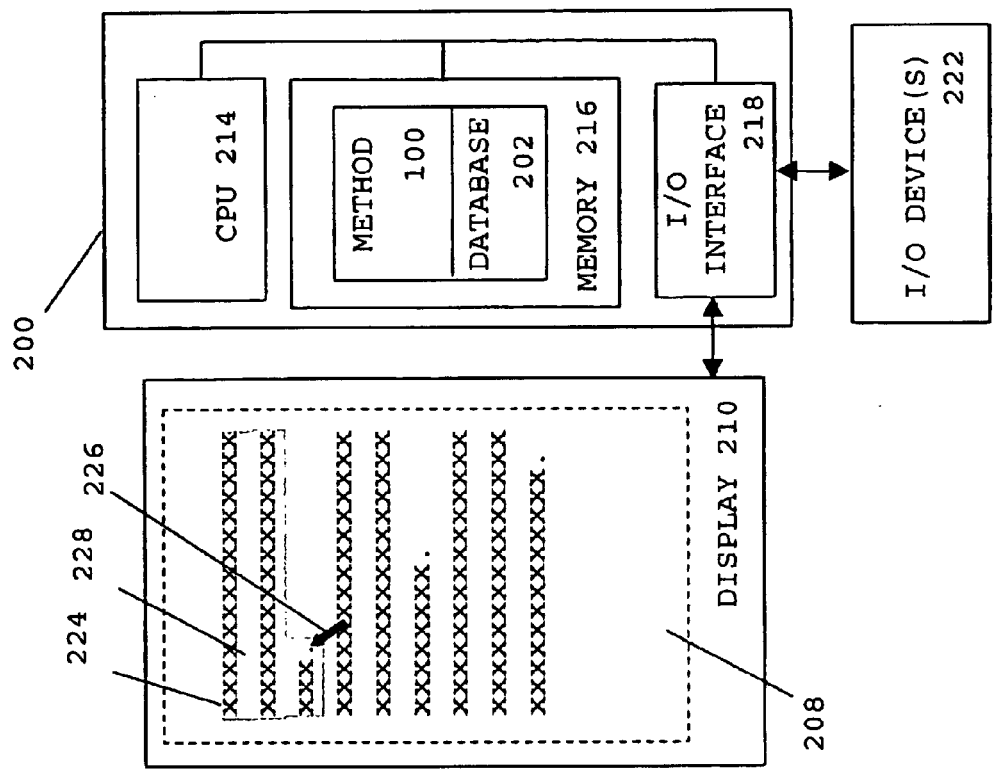
Figure 2A:
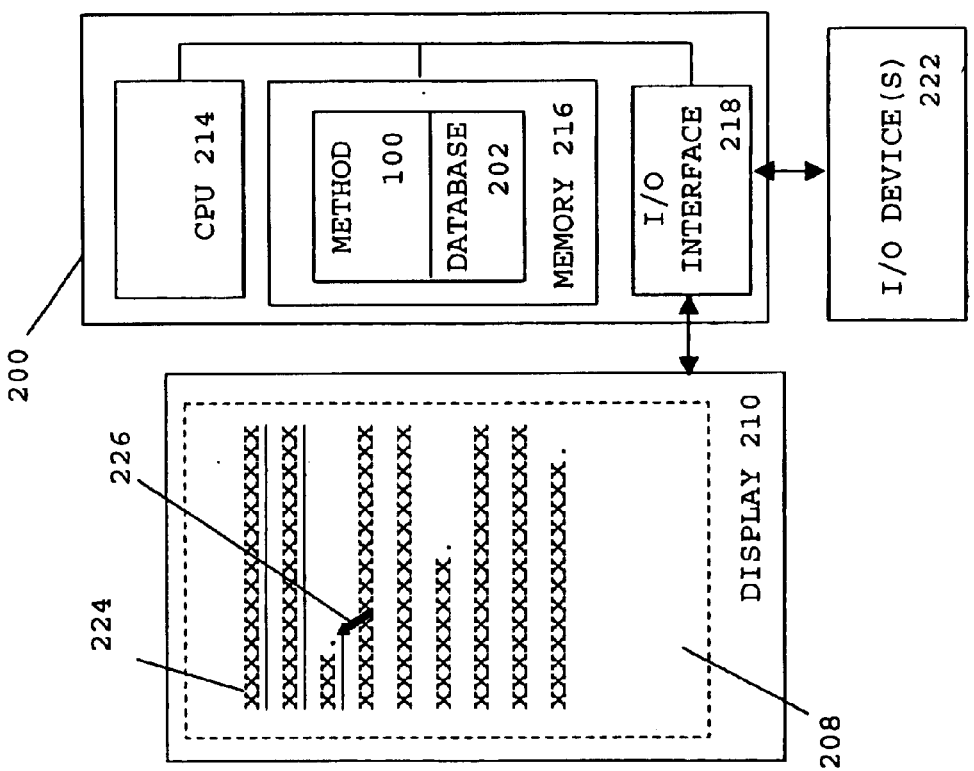

In FIG. 1, according to method 100, in one embodiment of the invention, at operation 110, a user selects text on a display to be highlighted. For example, referring to FIG. 2A, method 100 can be implemented on computer system 200 such that a user can select text 224 to be highlighted on display 210. The user can select text 224 utilizing any of a variety of input devices 222, such as a mouse or digitizing pad. The selection of text 224 can be effected, for example, by holding down the mouse button and dragging cursor 226 across text 224. In FIG. 2A, the selection of text 224 is indicated by underlining for ease of description, however, it can be appreciated by those of skill in the art that the selection of text to be highlighted can be accomplished by any variety of conventional means, such as bolding, graying, changing the text color, and that the present illustration utilizing underlining is not meant to be limiting upon the invention.

Returning to FIG. 1, after selection of the text to be highlighted, at operation 112, the total display area of the display is determined. For example, referring to FIG. 2A, the total display area of display 210 is determined. The total display area can be a default value accessible by method 100 or can be calculated by method 100. In one embodiment, the total display area is defined as the total display area in which highlighted and non-highlighted data, such as text, can be displayed to a user. For example, the area enclosed by the dotted margins on display 210 can be the total display area. In other embodiments, the total display area can include marginal areas of display 210 in which data, such as text, cannot be displayed, or can include just the page area on which the text is located. The area units can be standard area measurements, such as Anglo-Saxon or Metric units, or can be in other measurement units, such as pixels.

Returning to FIG. 1, after determination of the total display area, at operation 114, the total highlighted display area, including the text selected in operation 110, is determined. The total highlighted display area includes both the text area that is to be highlighted, as well as, any text area already highlighted on the display. Referring to FIG. 2A, the total highlighted display area on display 210 is the area in which text 224 is to be highlighted.

Returning to FIG. 1, at operation 116, the background color of the non-highlighted display area is determined. For example, referring to FIG. 2A, the background color 208 of the non-highlighted display area is determined. Determination of the background color can be accomplished in a wide variety of ways, such as by determining the default or user selected background color of the non-highlighted display area.

Determination of the background color provides a reference for selecting the perceptual highlight color. For example, if a background color displayed on the display is very light, selection of some color groups or shades as the perceptual highlight color can affect the perception of the highlighted text in a negative manner, thus negating the point of highlighting—focus of the user on the highlighted text. Considering the background color of the non-highlighted display area provides the backdrop reference point against which the perceptual highlight color is contrasted when presented to the user.

Returning to FIG. 1, at operation 118, the perceptual highlight color of the highlighted display area is determined based upon the total highlighted display area and the background color. In one embodiment, determination of the perceptual highlight color is made by dividing the total highlighted display area by the total display area. The resulting fraction or percentage can then be augmented by the background color of the non-highlighted area to determine the perceptual highlight color. For example, a perceptual highlight color database having highlighted display area values and background colors and/or background color valuations can be used to select the perceptual highlight color. The perceptual highlight color database can be implemented as internal to method 100 or can be external and accessed by method 100.

The perceptual highlight color database can include a full or partial selection of the color spectrum, or can include contrast gradations to be applied to a highlight color already selected either by default or by the user. For example, referring to FIG. 2A, if the total highlighted display area, e.g., text 224, was 0.20 (one-fifth) of display 210, and the background color 208 was light gray, the perceptual highlight color database 202 can then be referenced for the perceptual highlight color corresponding with the highlighted display area value 0.20 and the background color 208 light gray to select the perceptual highlight color.

The perceptual highlight color database can take a wide variety of forms, however, the color and/or contrast gradations are referenced so that the salience of the highlighted display area remains constant as the highlighted area varies. For example, in one embodiment, as the highlighted display area increases the contrast between the perceptual highlight color and the background color of the non-highlighted display area decreases so as not to overwhelm a user with a large amount of highly color saturated highlighted text. Conversely, as the highlighted display area decreases, the contrast between the perceptual highlight color and the background color of the non-highlighted display area increases so as to focus the user on a smaller area of highlighted text.

At operation 120, the highlighted display area(s) is displayed on the display highlighted with the perceptual highlight color determined at operation 118. The perceptual highlight color can be displayed as the background color behind the selected text, the text color, or both. Referring to FIG. 2B, text 224 (FIG. 2A) is displayed with perceptual highlight color 228 presented behind text 224.

Method 100 can be repeatedly used, such as in an automatic and/or user selected refresh operation of the display, further shown and described with reference to FIGS. 2C and 2D.

In FIG. 2C, highlighted text 224 is displayed on display 210 highlighted with perceptual highlight color 228, and the user has next selected text 230 to be highlighted, thus completing operation 110 (FIG. 1). Operations 112 thought 118 (FIG. 1) are then repeated now including text 230 to determine the perceptual highlight color to be applied to the highlighted text. In particular, the total highlighted display area now includes both highlighted text 224 and text 230 to be highlighted.

In FIG. 2D, the text 224 and 230 are displayed with the newly determined perceptual highlight color 232, completing operation 120 (FIG. 1). As the amount of highlighted screen area has increased, the perceptual highlight color 232 has a decreased contrast with the background color when compared to perceptual highlight color 228 to maintain the salience of the highlighted display area to the user.

In further embodiments of the present invention, additional factors can be considered in maintaining a more constant salience of the highlighted text to a viewing user. In particular, the text color or the text color and the background color of the non-highlighted display area can be considered together with the total amount of the highlighted display area in determining the perceptual highlight color used in display of highlighted text to the user.

Figure 3:
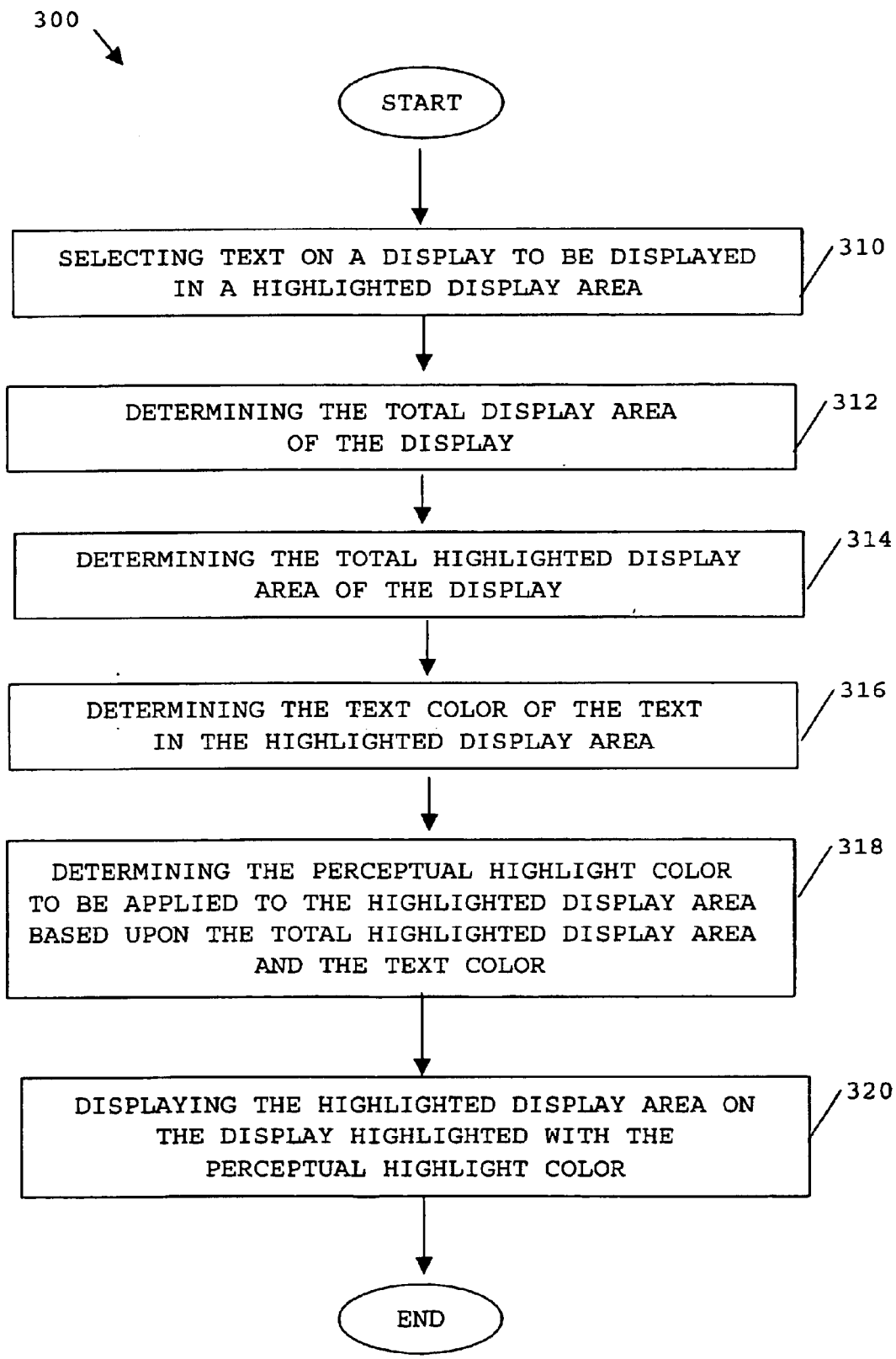
FIG. 3 illustrates a process flow diagram of a method for providing perceptual-based color selection for highlighting text on a display based upon the total highlighted display area and the text color of the text in the highlighted display area according to one embodiment of the present invention.

FIG. 3 illustrates a process flow diagram of a method for providing perceptual-based color selection for highlighting text on a display based upon the total highlighted display area and the text color of the text in the highlighted display area according to one embodiment of the present invention.

According to method 300, in one embodiment of the invention, operations 310 through 314 are performed as earlier described with reference to method 100 and operations 110 through 114, herewith incorporated by reference.

At operation 316, the text color of the text in the highlighted display area is determined. As earlier described, the highlighted display area includes areas of the display designated to be highlighted, such as text to be highlighted, as well as areas of the display already highlighted. Determination of the text color can be accomplished in a wide variety of ways, such as by determining the default or user selected text color associated with the selected text. For example, if a text color displayed on the display is green, selection of some color groups or shades as the perceptual highlight color can affect the perception of the text in a negative manner, thus, again, negating the point of highlighting. Thus, considering the text color of the non-highlighted display area provides a different reference point against which the perceptual highlight color is contrasted when presented to the user.

At operation 318, the perceptual highlight color of the highlighted display area is determined based upon the total highlighted display area and the text color. In one embodiment, the total highlighted display area is divided by the total display area to arrive at a fractional or percentage value. This value can then be augmented by the text color to determine the perceptual highlight color. For example, a perceptual highlight color database having highlighted display area values and text colors and/or text color valuations and can be used to select a corresponding perceptual highlight color.

At operation 320, the highlighted display area(s) is displayed on the display highlighted with the perceptual highlight color determined at operation 318.

In another embodiment of the invention, the background color of the non-highlighted display and the text color are considered together with the total amount of the highlighted display area in determining the perceptual highlight color used in display of highlighted text to the user.

Figure 4:
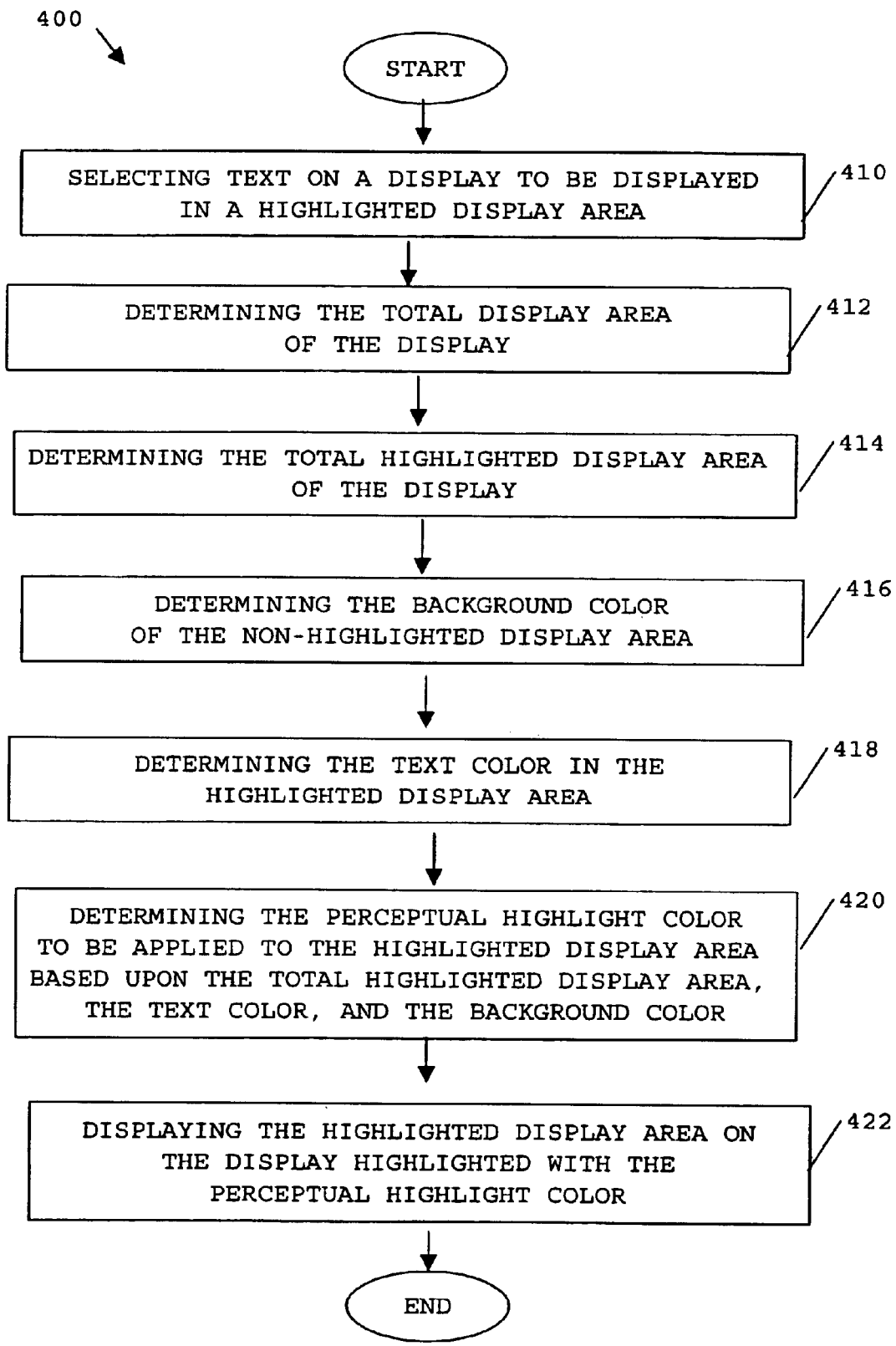
FIG. 4 illustrates a process flow diagram of a method for providing perceptual-based color selection for highlighting text on a display based upon the total highlighted display area, the text color of the text in the highlighted display area, and the background color of the non-highlighted display area according to one embodiment of the present invention.

FIG. 4 illustrates a process flow diagram of a method for providing perceptual-based color selection for highlighting text on a display based upon the total highlighted display area, the text color of the text in the highlighted display area, and the background color of the non-highlighted display area according to one embodiment of the present invention.

According to method 400, in one embodiment of the invention, operations 410 through 414 are performed as earlier described with reference to method 100 and operations 110 through 114, herewith incorporated by reference.

At operation 416, the background color of the non-highlighted display area in the display is determined. In one embodiment, the background color is determined as earlier described with reference to method 100 and operation 116, herewith incorporated by reference.

At operation 418, the text color of the text in the highlighted display area in the display is determined. In one embodiment, the text color is determined as earlier described with reference to method 300 and operation 316, herewith incorporated by reference.

At operation 420, the perceptual highlight color of the highlighted display area is determined based upon the total highlighted display area, the background color of the non-highlighted display area, and the text color. In one embodiment, the total highlighted display area is divided by the total display area to arrive at a fractional or percentage value. This value can then be augmented by the background color of the non-highlighted display area and the text color to determine the perceptual highlight color. For example, a perceptual highlight color database having total highlighted display area values, background colors and/or background color valuations, and text colors and/or text color valuations and can be used to select a corresponding perceptual highlight color.

At operation 422, the highlighted-display area(s) is displayed on the display highlighted with the perceptual highlight color determined at operation 420.

Figure 5:
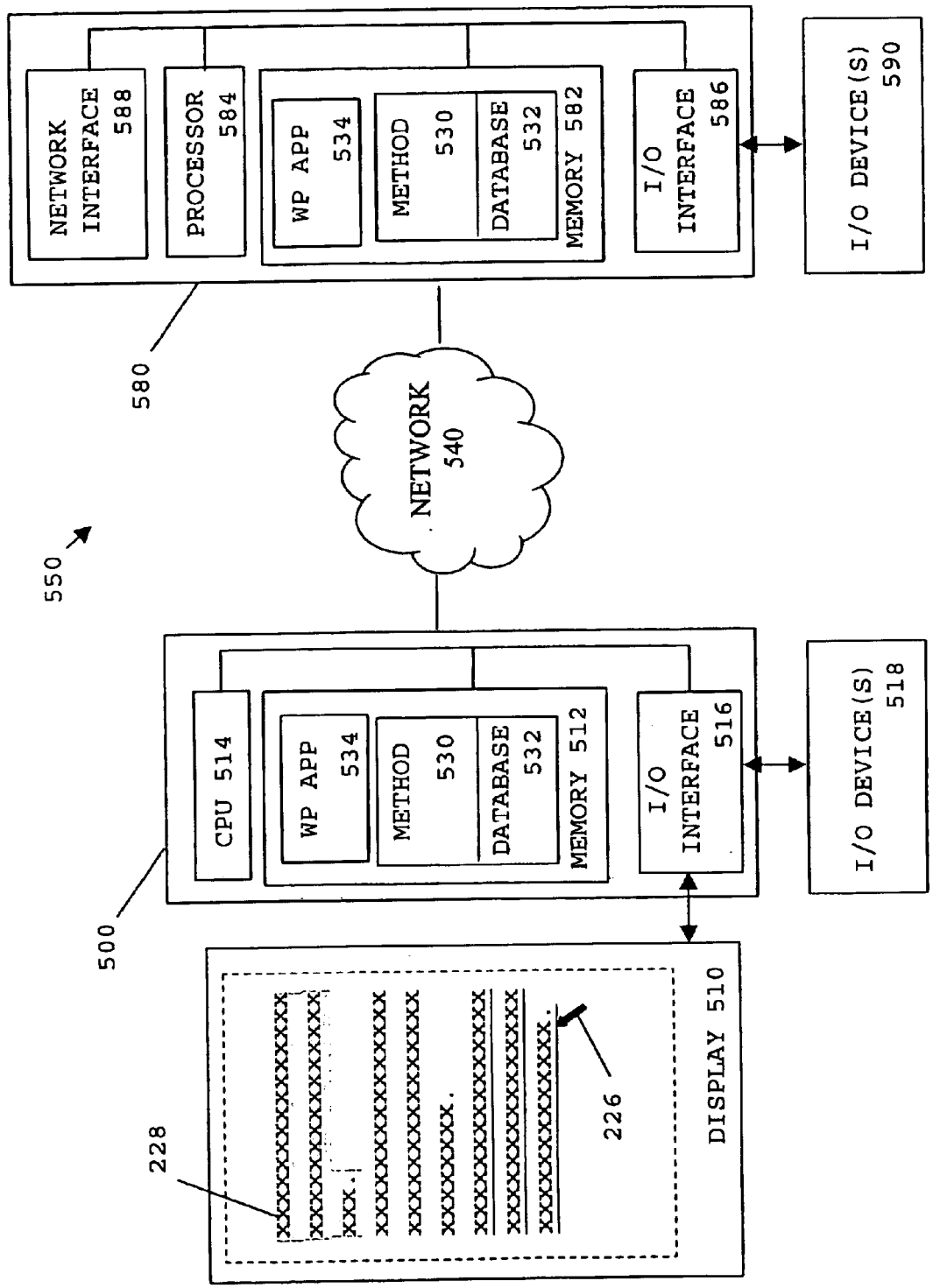
FIG. 5 illustrates one example of a system in which the present invention can be implemented.

FIG. 5 illustrates one example of a system in which the present invention can be implemented. The present invention can be implemented in a variety of ways, including in a stand alone system, such as a personal computer or workstation, as illustrated schematically in FIG. 5 by computer system 500. The present invention can also be implemented in a client-server configuration 550 that is also illustrated in FIG. 5.

Method 530 can include one, some, or all of methods 100, 300, and 400 as described herein. Perceptual highlight color database 532 can be included with method 530 or can be external to method 530 and accessed by method 530. The perceptual highlight color(s) of the present invention, such as perceptual highlight color 228, can be displayed on a display of client device 500, such as display 510, while some or all operations of methods 100, 300, and 400, herein designated as method 530, are carried out on a server computer 580 accessible by the client device 500 over a data network 540, such as the Internet, using a browser application or the like. Method 530, perceptual color database 532, and word processing application 534 can be stored in memory 512 on computer system 500 or in memory 582 on server computer 580.

Herein, a computer program product comprises a medium configured to store or transport computer-readable instructions, such as program code, for method 530, or in which computer-readable instructions for method 530 are stored, and can include perceptual highlight color database 532 as well. Some examples of computer program products are CD-ROM discs, ROM cards, floppy discs, magnetic tapes, computer hard drives, servers on a network and signals transmitted over a network representing computer-readable instructions.

Further herein, a means for performing a particular function is accomplished using the appropriate computer-readable instructions and the related hardware necessary to performing the function.

As illustrated in FIG. 5, this storage medium can belong to computer system 500 itself. However, the storage medium also can be removed from computer system 500. For example, method 530 can be stored in memory (not shown) that is physically located in a location different from processor 514, as well as in a location different from word processor application 534 and/or perceptual color database 532. If method 530 is implemented in conjunction with word processor application 534, the only requirement is that processor 514 is coupled to the memory containing method 530 and that method 530 have access to word processor application 534 and perceptual color database 532 (if not internal to method 530). This could be accomplished in a client-server system 550, e.g., system 500 is the client and system 580 is the server, or alternatively via a connection to another computer via modems and analog lines, or digital interfaces and a digital carrier line.

For example, memory 582 could be in a World Wide Web portal, while display 510 and processor 514 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 500, in one embodiment, can be a portable computer, a workstation, a two-way pager, a cellular telephone, a digital wireless telephone, a personal digital assistant, a server computer, an Internet appliance, or any other device that includes the components shown and that can execute method 530 including access to perceptual color database 532. Similarly, in another embodiment, computer system 500 can be comprised of multiple different computers, wireless devices, cellular telephones, digital telephones, two-way pagers, or personal digital assistants, server computers, or any desired combination of these devices that are interconnected to perform, method 530 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 530 can be implemented in a wide variety of computer system configurations. In addition, method 530 and perceptual color database 532 could be stored as different modules in memories of different devices. For example, method 530 and perceptual color database 532 could initially be stored in a server computer 580, and then as necessary, a module of method 530 could be transferred to a client device 500 and executed on client device 500. Consequently, part of method 530 would be executed on the server processor 584, and another part of method 530 would be executed on processor 514 of client device 500.

Further, in view of this disclosure, those of skill in the art can implement the invention in a wide-variety of physical hardware configurations using an operating system and computer programming language of interest to the user. For example, input devices 518 and 590 can be a mouse, or other input device, such as digitizing pads, wireless devices, speech recognition software, and/or hardware could be used to input the selections and data for method 530.

In yet another embodiment, method 530 is stored in memory 582 of system 580. Stored method 530 is transferred, over network 540 to memory 512 in system 500. In this embodiment, network interface 588 and I/O interface 516 would include analog modems, digital modems, or a network interface card. If modems are used, network 540 includes a communications network, and method 530 is downloaded via the communications network.

Method 530 can be implemented in a computer program, such as word-processing application 534, including comprehensive office application STAROFFICE that is available from Sun Microsystems, Inc. of Palo Alto, Calif. (STAROFFICE is a trademark of Sun Microsystems.) Such a computer program can be stored on any common data carrier like, for example, a floppy disk or a compact disc (CD), as well as on any common computer system's storage facilities like hard disks. Therefore, an embodiment of the present invention also relates to a data carrier for storing a computer program for carrying out the inventive method.

Another embodiment of the present invention relates to a method for using a computer system for carrying out the presented inventive method. Yet another embodiment of the present invention relates to a computer system with a storage medium on which a computer program for carrying out the presented inventive method is stored. One of skill in the art can recognize that in some embodiments many of the operations of method 530 can occur automatically without user input while others can occur automatically as a result of user input.

Further, while the invention has been particularly shown with reference to an embodiment thereof, it can be understood by those skilled in the art that various other changes in the form and details can be made therein without departing from the spirit and scope of the invention. For example, although the use of a perceptual color database is described herein for use in determining the perceptual highlight color, the perceptual highlight color can also be determined using other perceptual color selection schema, such as algorithms or logic trees. Additionally, although the operations of determining the total display area, determining the total highlighted display area, determining the background color of the non-highlighted display area, and determining the text color in the highlighted display area have been described in accordance with related methods 100, 300 and 400, no particular order is ascribed to the performance of the operations so long as the determinations are available for determination of the perceptual highlight color.

What is claimed is:

1. A method for providing perceptual-based color selection for highlighting text on a display, the method comprising:

selecting text to be highlighted in a highlighted display area of a display;

determining the total display area on a display, the display capable of displaying a highlighted display area and a non-highlighted display area, the non-highlighted display area having a background color;

determining the total highlighted display area on the display, the highlighted display area including areas of text selected to be highlighted and areas of text highlighted on the display;

determining the background color of the non-highlighted display area;

determining the perceptual highlight color to be applied to the highlighted display area based upon the total highlighted display area and the background color; and displaying the highlighted display area(s), including the text, on the display highlighted with the perceptual highlight color.

2. The method of claim 1, wherein the salience of the highlighted display area remains constant to a viewer of the display as the total highlighted display area varies.

3. The method of claim 1, wherein the contrast between the perceptual highlight color and the background color of the non-highlighted display area increases as the total highlighted display area decreases.

4. The method of claim 1, wherein the contrast between the perceptual highlight color and the background color of the non-highlighted display area decreases as the total highlighted display area increases.

5. The method of claim 1, wherein the contrast between the perceptual highlight color and the background color of the non-highlighted display area varies inversely to the total highlighted display area.

6. The method of claim 1, wherein the perceptual highlight color is determined utilizing a perceptual highlight color database.

7. The method of claim 1, wherein the highlighted display area includes text having a text color, the method further comprising:

determining the text color; and wherein determining the perceptual highlight color of the highlighted display area is further based upon the text color.

8. The method of claim 7, wherein the perceptual highlight color is determined utilizing a perceptual highlight color database.

9. A method for providing perceptual-based color selection for highlighting text on a display, the method comprising:

selecting text to be highlighted in a highlighted display area of a display, the text having a text color;

determining the total display area on a display, the display capable of displaying a highlighted display area and a non-highlighted display area, the non-highlighted display area having a background color;

determining the total highlighted display area on the display, the highlighted display area including text selected to be highlighted and text highlighted on the display;

determining the text color;

determining the perceptual highlight color to be applied to the highlighted display area based upon the total highlighted display area and the text color; and displaying the highlighted display area on the display highlighted with the perceptual highlight color.

10. The method of claim 9, wherein the salience of the highlighted display area remains constant to a viewer of the display as the total highlighted display area varies.

11. The method of claim 9, wherein the perceptual highlight color is determined utilizing a perceptual highlight color database.

12. A computer program product for providing perceptual-based color selection for highlighting text on a display, the computer program product comprising computer-readable instructions for a method comprising:

selecting text to be highlighted as a highlighted display area of a display;

determining the total display area on a display, the display capable of displaying a highlighted display area and a non-highlighted display area, the non-highlighted display area having a background color;

determining the total highlighted display area on the display, the highlighted display area including text selected to be highlighted and text highlighted on the display;

determining the background color of the non-highlighted display area;

determining the perceptual highlight color to be applied to the highlighted display area based upon the total highlighted display area and the background color; and displaying the highlighted display area on the display highlighted with the perceptual highlight color.

13. The computer product of claim 12, wherein the salience of the highlighted display area remains constant to a viewer of the display as the total highlighted display area varies.

14. The computer product of claim 12, wherein the contrast between the perceptual highlight color and the background color of the non-highlighted display area varies inversely to the total highlighted display area.

15. The computer product of claim 12, wherein the highlighted display area includes text having a text color, and wherein determining the perceptual highlight color of the highlighted display area is further based upon the text color.

16. The computer product of claim 12, wherein the perceptual highlight color is determined utilizing a perceptual highlight color database.

17. The computer product of claim 12, wherein the text further has a text color, the method further comprising:

determining the text color of the text to be highlighted; and wherein determining the perceptual highlight color of the highlighted display area is further based upon the text color.

18. The computer product of claim 17, wherein the perceptual highlight color is determined utilizing a perceptual highlight color database.

19. A computer program product for providing perceptual-based color selection for highlighting text on a display, the computer program product comprising computer-readable instructions for a method comprising:

selecting text to be highlighted as a highlighted display area of a display, the text having a text color;

determining the total display area on a display, the display capable of displaying a highlighted display area and a non-highlighted display area, the non-highlighted display area having a background color;

determining the total highlighted display area on the display, the highlighted display area including text selected to be highlighted and text highlighted on the display;

determining the text color;

determining the perceptual highlight color to be applied to the highlighted display area based upon the total highlighted display area and the text color; and displaying the highlighted display area on the display highlighted with the perceptual highlight color.

20. The computer product of claim 19, wherein the salience of the highlighted display area remains constant to a viewer of the display as the total highlighted display area varies.

21. The computer product of claim 19, wherein the perceptual highlight color is determined utilizing a perceptual highlight color database.

22. A method for providing perceptual-based color selection for highlighting text on a display, the method comprising:

means for selecting text to be highlighted in a highlighted display area of a display;

means for determining the total display area on a display, the display capable of displaying a highlighted display area and a non-highlighted display area, the non-highlighted display area having a background color;

means for determining the total highlighted display area on the display, the highlighted display area including areas of text selected to be highlighted and areas of text highlighted on the display;

means for determining the background color of the non-highlighted display area;

means for determining the perceptual highlight color to be applied to the highlighted display area based upon the total highlighted display area and the background color; and means for displaying the highlighted display area(s), including the text, on the display highlighted with the perceptual highlight color.

23. The method of claim 22, wherein the highlighted display area includes text having a text color, the method further comprising:

means for determining the text color, and wherein the means for determining the perceptual highlight color of the highlighted display area is further based upon the text color.

24. A method for providing perceptual-based color selection for highlighting text on a display, the method comprising:

means for selecting text to be highlighted in a highlighted display area of a display, the text having a text color;

means for determining the total display area on a display, the display capable of displaying a highlighted display area and a non-highlighted display area, the non-highlighted display area having a background color;

means for determining the total highlighted display area on the display, the highlighted display area including text selected to be highlighted and text highlighted on the display;

means for determining the text color;

means for determining the perceptual highlight color to be applied to the highlighted display area based upon the total highlighted display area and the text color; and means for displaying the highlighted display area on the display highlighted with the perceptual highlight color.

* * * * *